Patented Feb. 26, 1935

1,992,854

UNITED STATES PATENT OFFICE 1,992,854

PROCESS FOR THE OBTAINING OF SOLUTIONS OF BERYLLIUM FLUORIDE FROM DOUBLE FLUORIDE OF BERYLLIUM AND OF AN ALKALI METAL

Maurice Beja, Salindres, France, assignor to Compagnie de Produits Chimiques et Electrometallurgiques Alais, Froges et Camargue, Paris, France, a corporation of France No Drawing. Application September 6, 1933, Serial No. 688,412. In France October 5, 1932

6 Claims. (Cl. 23—88)

The problem of obtaining beryllium fluoride free from sodium fluoride, starting from double fluoride of beryllium and sodium, has already formed the subject of numerous works.

Illig, Hosenfeld and Fischer, for example, indicate in a treatise entitled "Investigations upon the action of crude beryls and upon the preparation of beryllium salts suitable for electrolysis", published in Wissenschaftliche Veroffentlichungen aus dem Siemens Konzern", Vol. VIII, 1st fascicule, 1929, page 40, that they attempted, amongst others, to combine the fluoride of sodium of the $BeF_2NaF$ with fluoride of aluminium. For that purpose, they melted at high temperature with the fluoride of aluminium, the double fluoride of beryllium and sodium, obtained by crystallization. They hoped that there would thus be formed, according to the reaction:—

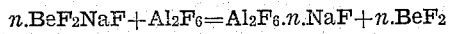

$$n.BeF_2NaF + Al_2F_6 = Al_2F_6.n.NaF + n.BeF_2$$

cryolite and fluoride of beryllium, and that when taken up with water, the $BeF_2$ would pass alone into solution, whilst the cryolite would remain insoluble and would retain the whole of the NaF. Now, the authors above mentioned ascertained that, contrary to their expectation, the fluoride of sodium remains fixed to the fluoride of beryllium and passes afresh completely into solution. They conclude from their experiments that the affinity of fluoride of sodium is greater for the fluoride of beryllium than for the fluoride of aluminium.

Contrary to the results of Illig, Hosenfeld and Fischer, I have found that it was very easy to combine the NaF of the double fluoride of beryllium and sodium with fluoride of aluminium. To obtain this result, it is, however, necessary not to operate by igneous fusion of the mixture of $BeF_2NaF$ and fluoride of aluminium, as was done by the previously mentioned authors, but to cause these salts to react upon one another in the presence of water.

One may, for example, mix a solution of $BeF_2NaF$ with a solution of $Al_2F_6$, or else one may introduce into an agitated solution of $Al_2F_6$, crystallized double fluoride of beryllium and sodium. One may also introduce into a solution of $BeF_2NaF$, solid and difficultly soluble hydrated fluoride of aluminium $(Al_2F_6.7H_2O)$, or again one may project into water, separately or in mixture, crystallized double fluoride of beryllium and sodium and solid and difficultly soluble hydrated fluoride of aluminum $(Al_2F_6.7H_2O)$. In every case, whether working at the ordinary temperature or else at a higher temperature, the NaF combines with the $Al_2F_6$ in order to yield insoluble cryolite, whilst the $BeF_2$ remains or passes into solution. The solution of $BeF_2$ is afterwards separated, by decantation or filtration, from the precipitate of cryolite.

The effectiveness of rendering the NaF insoluble in the form of cryolite is greater in proportion as the quantity of $Al_2F_6$ brought into operation for a given weight of NaF is greater. From this fact, the employment of fluoride of aluminium in solution is somewhat limited, because, if it be utilized in excess, this excess remains in solution with the fluoride of beryllium, which is undesirable.

The solid hydrated fluoride of aluminium $(Al_2F_6.7H_2O)$ being on the other hand very little soluble in water, one may without inconvenience employ it in great excess and thus effect a very intense insolubilization of the NaF. The excess of solid and difficultly soluble fluoride of aluminium $(Al_2F_6.7H_2O)$ brought into operation is eliminated with the cryolite.

The quantity of solid hydrated fluoride of aluminium $(Al_2F_6.7H_2O)$, necessary to eliminate a given weight of NaF, varies moreover with the state of division of the fluoride of aluminium. The finer the particle of fluoride of aluminium, the less thereof will be necessary.

One may also combine the use of fluoride of aluminium in solution $(Al_2F_6)$ and in the solid hydrated state, $(Al_2F_6.7H_2O)$. One first introduces, into a solution of fluoride of aluminium, a quantity of $BeF_2NaF$ sufficient for the whole of the $Al_2F_6$ to combine with the greater part of the NaF in the form of an insoluble compound which precipitates. In the solution, one has a mixture of $BeF_2$ and $BeF_2NaF$, to which there is added solid and difficultly soluble hydrated fluoride of aluminium $(Al_2F_6.7H_2O)$, in quantity sufficient to precipitate almost all the NaF left in solution.

If the double fluoride of beryllium and alkali metal is available in solid form, it is advantageous to carry out the above reactions by employing, per liter of water, quantities of double fluoride of beryllium and alkali metal greater than those corresponding to the solubility of these salts in water. It is possible to obtain directly in this way concentrated solutions of beryllium fluoride.

In the foregoing, one has always spoken of the compound $BeF_2NaF$, but it is obvious that the processes described for the obtaining of $BeF_2$ free from NaF apply also to compounds containing more or less NaF per molecule of $BeF_2$.

The following examples set out, without however limiting them, the conditions allowing of carrying out the invention.

Example 1

One heats to 70° C. a litre of solution of fluoride of aluminium having 55 grammes of $Al_2F_6$ per litre, and one introduces thereinto, whilst agitating it, 90 grammes of double fluoride of beryllium and sodium in powder form, containing 45.8% of $BeF_2$ and 52.3% of NaF (that is to say 114 parts of NaF per 100 parts of $BeF_2$). The agitation is continued for some hours. In the solution obtained, which contains the whole of the $BeF_2$ put to use, one finds for 100 parts of $BeF_2$, 2.7 parts of $Al_2F_6$ and 14.5 parts of NaF. The effectiveness of the elimination of NaF has therefore been 87.3 per cent.

Example 2

One mixes 260 grammes of double fluoride of beryllium and sodium in powder form, containing 38.9% of $BeF_2$ and 54% of NaF (that is 138.7 parts of NaF for 100 parts of $BeF_2$), with 660 grammes of solid and difficultly soluble hydrated fluoride of aluminium ($Al_2F_6.7H_2O$) containing 55% of $Al_2F_6$. One introduces the mixture, all at one time or in fractions, into a glass vessel furnished with a stirrer and containing 1 litre of water.

After an agitation for a total duration of 7 hours, at ordinary temperature, one extracts on a filter under vacuum. The extracted solution contains about 82% of the $BeF_2$ employed. There is therein found for 100 parts of $BeF_2$, 2.1 parts of $Al_2F_6$ and 1.6 parts of NaF. The effectiveness of the elimination of the NaF has thus been 98.8%.

The mixture of cryolite and fluoride of aluminium collected upon the filter is subjected to a methodical washing. There is thus recovered the whole of the $BeF_2$ retained by these residues. The washing water is employed for a fresh operation.

Example 3

To the solution of $BeF_2$, obtained in the Example 1 and containing 14.5 parts of NaF for 100 parts of $BeF_2$, there are added 5 grammes of solid and difficultly soluble hydrated fluoride of aluminium ($Al_2F_6.7H_2O$) (containing 55% of $Al_2F_6$ per gramme of NaF in solution. After prolonged agitation at ordinary temperature, the solution contains no more than 2.0 parts of NaF for 100 parts of $BeF_2$.

Of course, the invention might also be applied to double fluorides in which the fluoride of sodium would be replaced by another alkali fluoride, giving with the fluoride of aluminium, a difficultly soluble compound.

The examples given above show that the fluoride of aluminum in solution, or in the state of solid hydrate ($Al_2F_6.7H_2O$) thoroughly eliminates the NaF of the double fluoride of beryllium and sodium. If Illig, Hosenfeld and Fischer have not obtained this result, by melting together fluoride of aluminum and double fluoride of beryllium and sodium, and then recovering by water the product of the fusion, it is because these authors worked with a fusion. This fusion caused the fluoride of aluminum to be in the anhydride state, at the time when the recovery by water was attempted. The fluoride of aluminum in the anhydride state is insoluble in the water used in the attempt to dissolve any $BeF_2$.

What I claim is:

1. A process for the obtaining of aqueous solutions of fluoride of beryllium from a double fluoride of beryllium and of an alkali metal, consisting in treating the said double fluoride in an aqueous medium by hydrated fluoride of aluminium.

2. A process for the obtaining of aqueous solutions of fluoride of beryllium from a double fluoride of beryllium and of an alkali metal, consisting in bringing together the said double fluoride in an aqueous medium with a solid and difficultly soluble hydrated fluoride of aluminium ($Al_2F_6.7H_2O$).

3. A process for the obtaining of aqueous solutions of fluoride of beryllium from a double fluoride of beryllium and of an alkali metal, consisting in treating the said double fluoride in the crystallized state in an aqueous medium by hydrated fluoride of aluminium.

4. A process for the obtaining of aqueous solutions of fluoride of beryllium from a double fluoride of beryllium and of an alkali metal, consisting in treating the said double fluoride in the dissolved state in an aqueous medium by hydrated fluoride of aluminium.

5. A process for the obtaining of aqueous solutions of fluoride of beryllium from a double fluoride of beryllium and of an alkali metal, consisting in adding the said double fluoride and the solid and difficultly soluble hydrated fluoride of aluminium ($Al_2F_6.7H_2O$), the latter in excess, both in the solid state, to a quantity of water less than that which would be necessary to dissolve the double fluoride of beryllium and alkali metal.

6. A process for the obtaining of aqueous solutions of fluoride of beryllium from a double fluoride of beryllium and of an alkali metal, consisting in first adding to the double fluoride a quantity of a solution of aluminium fluoride ($Al_2F_6$) insufficient for rendering insoluble the alkali fluoride of the double fluoride brought into operation, and then adding solid and difficultly soluble hydrated fluoride of aluminium ($Al_2F_6.7H_2O$) for rendering insoluble the alkali fluoride left in solution.

MAURICE BEJA.